(12) United States Patent
Rezaie et al.

(10) Patent No.: US 12,720,474 B2
(45) Date of Patent: Aug. 25, 2026

(54) POSITION ESTIMATION IN A COMMUNICATION SYSTEM

(71) Applicant: Nokia Technologies Oy, Espoo (FI)

(72) Inventors: Sajad Rezaie, Aalborg (DK); Oana-Elena Barbu, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 287 days.

(21) Appl. No.: 18/651,847

(22) Filed: May 1, 2024

(65) Prior Publication Data

US 2024/0381292 A1 Nov. 14, 2024

(30) Foreign Application Priority Data

May 10, 2023 (GB) ..................................... 2306863

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC .... H04W 64/00; H04L 5/0051; G01S 5/0268; G01S 5/0244; G01S 5/0278
See application file for complete search history.

(56) References Cited

U.S. PATENT DOCUMENTS 6,928,292 B2 8/2005 Tsunehara et al.
9,363,782 B2 6/2016 Tenny
9,723,437 B1 8/2017 Bitra et al.
2008/0026733 A1* 1/2008 Jaatinen ................ G01S 5/0257 455/414.2
2018/0227902 A1 8/2018 Gholmieh et al.
2018/0302891 A1 10/2018 Bitra et al.
2020/0266942 A1 8/2020 Akkarakaran et al.
2022/0060359 A1 2/2022 Park et al.
2022/0061014 A1* 2/2022 Sundararajan ...... H04W 64/006
2023/0266429 A1* 8/2023 Gopalakrishnan .... G01S 5/0278 342/451

FOREIGN PATENT DOCUMENTS

CN 104459617 A 3/2015
WO 2009/133656 A1 11/2009

(Continued)

OTHER PUBLICATIONS

Search Report received for corresponding United Kingdom Patent Application No. 2306863.8, dated Apr. 4, 2025, 1 page.

(Continued)

*Primary Examiner* — Ankur Jain
(74) *Attorney, Agent, or Firm* — Nokia Technologies Oy

(57) ABSTRACT

The present subject matter relates to a method receiving reference signals from at least one node, the reference signals being received in multiple carrier frequencies; processing the reference signals for determining per carrier frequency a position of the apparatus; determining a weight per carrier frequency, the weight of a specific carrier frequency being indicative of relationships between the position determined for the specific carrier frequency and the determined positions of the remaining carrier frequencies; weighting the determined positions using the weights for obtaining an estimate of the position of the apparatus.

20 Claims, 7 Drawing Sheets

(56) References Cited

FOREIGN PATENT DOCUMENTS

| | | | |
|---|---|---|---|
| WO | 2019/083419 | A1 | 5/2019 |
| WO | 2020150172 | A1 | 7/2020 |
| WO | 2022/082150 | A1 | 4/2022 |

OTHER PUBLICATIONS

Extended European Search Report received for corresponding European Patent Application No. 24173750.1, dated Oct. 25, 2024, 9 pages.
"New WID on Expanded and Improved NR Positioning", 3GPP TSG RAN Meeting #98-e, RP-223549, Agenda: 9.1.1, Intel Corporation, Dec. 12-16, 2022, pp. 1-7.
"3rd Generation Partnership Project; Technical Specification Group Radio Access Network; LTE Positioning Protocol (LPP) (Release 17)", 3GPP TS 37.355, V17.3.0, Dec. 2022, pp. 1-348.
Su et al., "Joint Channel Estimation Methods in Carrier Aggregation OFDM Systems", IEEE 79th Vehicular Technology Conference (VTC Spring), May 18-21, 2014, 5 pages.
"Msc-generator", Sourceforge, Retrieved on May 8, 2024, Webpage available at :https://sourceforge.net/projects/msc-generator/.
"3rd Generation Partnership Project; Technical Specification Group Radio Access Network; NG-RAN; NR Positioning Protocol A (NRPPa) (Release 17)", 3GPP TS 38.455, V17.3.0, Dec. 2022, pp. 1-201.
"3rd Generation Partnership Project; Technical Specification Group Radio Access Network; NR; Physical channels and modulation (Release 17)", 3GPP TS 38.211, V17.4.0, Dec. 2022, pp. 1-136.
"3rd Generation Partnership Project; Technical Specification Group Radio Access Network; NR; Physical layer procedures for data (Release 17)", 3GPP TS 38.214, V17.4.0, Dec. 2022, pp. 1-230.
"Views on the scope of Rel-18 Expanded and improved NR positioning WI", 3GPP TSG-RAN Meeting #98-e, RP-223286, Agenda: 9.2.6, Ericsson, Dec. 12-16, 2022, pp. 1-11.
Search Report received for corresponding United Kingdom Patent Application No. 2306863.8, dated Nov. 10, 2023, 4 pages.

* cited by examiner

POSITION ESTIMATION IN A COMMUNICATION SYSTEM

RELATED APPLICATION

This application claims priority to the United Kingdom Patent Application No. 2306863.8, filed on May 10, 2023, the content of which is incorporated herein by reference in its entirety.

TECHNICAL FIELD

Various example embodiments relate to telecommunication systems, and more particularly to position determination of an apparatus.

BACKGROUND

The fifth generation wireless networks (5G) refer to a new generation of radio systems and network architecture. 5G is expected to provide higher bitrates and coverage than the current long term evolution (LTE) systems. 5G is also expected to increase network expandability up to hundreds of thousands of connections. The 5G may enable the localization of devices in the system. However, there is a need to enhance the overall localization accuracy.

SUMMARY

Example embodiments provide an apparatus comprising means being configured for: receiving reference signals from at least one node, the reference signals being received in multiple carrier frequencies; processing the reference signals for determining per carrier frequency a position of the apparatus, referred to as measured position; determining a weight per carrier frequency being indicative of relationships between the position determined for the carrier frequency and the positions determined for the other carrier frequencies; weighting the measured positions using the weights for obtaining an estimate of a position of the apparatus. The term "measured position" is used for naming purpose to name the position of the apparatus which is determined by processing the reference signals.

Example embodiments provide a method comprising: receiving, by an apparatus, reference signals from at least one node, the reference signals being received in multiple carrier frequencies; processing the reference signals for determining per carrier frequency a position of the apparatus, referred to as measured position; determining a weight per carrier frequency being indicative of relationships between the position determined for the carrier frequency and the determined positions for the other carrier frequencies; weighting the measured positions using the weights for obtaining an estimate of a position of the apparatus.

Example embodiments provide a computer program comprising instructions for causing an apparatus for performing at least the following: receiving reference signals from at least one node, the reference signals being received in multiple carrier frequencies; processing the reference signals for determining per carrier frequency a position of the apparatus, referred to as measured position; determining a weight per carrier frequency being indicative of relationships between the position determined for the carrier frequency and the determined positions for the other carrier frequencies; weighting the measured positions using the weights for obtaining an estimate of a position of the apparatus.

The term "position" as used herein with reference to an apparatus may refer to positioning information regarding a location and/or orientation of the apparatus. The position of the apparatus may include at least one of: a location of the apparatus, an orientation of the apparatus, an elevation of the apparatus or a range of the apparatus to a node. The location may be a two-dimensional (2D) location or three-dimensional (3D) location.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
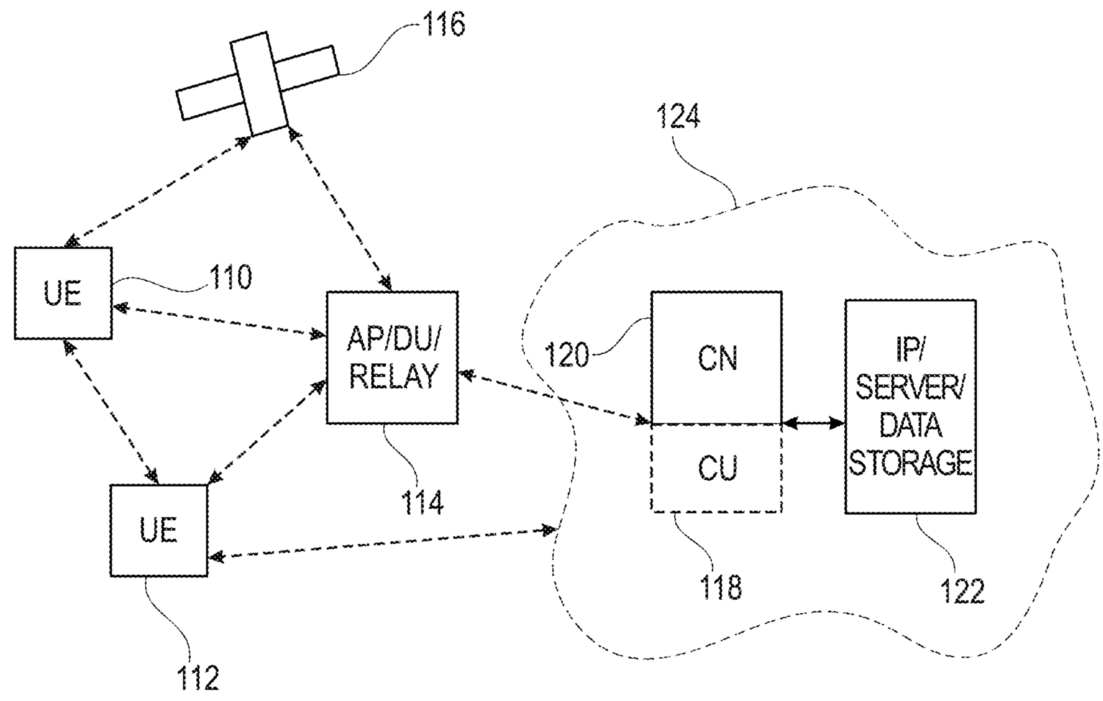
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

A communication system may be provided. The communication system comprises nodes such as base stations, wherein each node may serve user equipments (UEs) located within the node's geographical area of service or a cell. The communication system may support one or more radio access technologies (RATs). A radio access technology of the radio access technologies may, for example, be evolved universal terrestrial radio access (E-UTRA) or 5G new radio (NR), but it is not limited to, as a person skilled in the art may apply the present subject matter to other communication systems provided with necessary properties.

The communication system may be configured to provide reference signals. The reference signal may be a predetermined signal having a specific waveform, which is transmitted from a sender to a receiver and known to both the sender and the receiver. The present subject matter may advantageously use the reference signals to determine a position of an apparatus. The apparatus may, for example, be a terminal such as a user equipment (UE), a subscriber terminal, a smartphone, a mobile station, a mobile phone, a headset, a portable computer, a pad computer or another type of wireless mobile communication device operating with or without a subscriber identification module (SIM). Providing different types of apparatuses may enable a flexible implementation of the present subject matter. The position of the apparatus (e.g., such as a UE) may include at least one of: a location of the apparatus, an orientation of the apparatus, an elevation of the apparatus, a range of the apparatus to a node. In one example, the position of the apparatus may be the location of the apparatus, wherein the location may be a 2D location or 3D location. The location may be a relative or absolute location. The location may include geographic coordinates. In one example, the position of the apparatus may include an orientation of the apparatus. In one example, the position of the apparatus may include an elevation of the apparatus. In one example, the position of the apparatus may include a range of the apparatus with respect to the node that sends the reference signals used to determine the position.

In order to determine the position of the apparatus, one or more nodes of the communication system may, for example, be configured to send or broadcast reference signals. The node may, for example, be a base station, e.g., a Node B, enhanced or evolved NodeB (eNB), a home eNode B (HeNB), an access point (AP), a femto node, a femto base station, a transmit receive point (TRP) or any other equipment belonging to the communication system and implementing a radio communication interface. Providing different types of nodes may enable a flexible implementation of the present subject matter. Each node of the one or more nodes may be configured to transmit a reference signal in one carrier frequency or transmit the reference signal in more than one carrier frequency. The node may be configured to transmit the reference signal using carrier aggregation technique or multiple input multiple output (MIMO) technique.

The reference signal may be a radio frequency (RF) signal. The reference signal may comprise one or more signature sequences. The signature sequence may comprise complex values. The reference signal may comprise at least one signature sequence. In case the number of signature sequences in the reference signal is higher than one, said signature sequences may be repetitions of the same signature sequence. The signature sequence of the reference signal may, for example, be generated by the node. For example, each node may generate one distinct signature sequence. The signature sequence may be a sequence of complex values whose cyclically shifted versions are uncorrelated with one another. For example, the signature sequence may have an autocorrelation property according to which the autocorrelation of the signature sequence with a cyclically shifted version of itself is zero and it is non-zero at one instant which corresponds to no cyclic shift. The signature sequence may, for example, be a Constant Amplitude Zero AutoCorrelation (CAZAC) sequence or other sequences that possess the above correlation properties. The CAZAC sequence may be a periodic complex-valued signal with modulus one and out-of-phase periodic (cyclic) autocorrelations equal to zero. The signature sequence of the reference signal may be known to the apparatus and the node. This may enable the apparatus to determine its position based on the knowledge of the sequence. For example, the apparatus may receive information from the node indicating the cyclic shift and the root index to be used to generate the signature sequence. In another example, a shared database between the nodes and the apparatus may store information indicating the cyclic shifts and the root indexes used by the nodes.

The apparatus may be configured to receive the reference signals in multiple carrier frequencies. The carrier frequency may be referred to as $f_m$ where the subscript m is an index representing the carrier frequency. The index m may be any positive integer smaller than or equal to the total number of carrier frequencies N in which the reference signals are received by the apparatus. The position ($\rho_m$) of the apparatus may be determined using reference signals received by the apparatus in the carrier frequency $f_m$. For example, the position $\rho_1$ of the apparatus may be determined using reference signals received by the apparatus in the carrier frequency $f_1$, the position $\rho_2$ of the apparatus may be determined using reference signals received by the apparatus in the carrier frequency $f_2$, and so forth. The position $\rho_m$ of the apparatus may, for example, be determined using a set of one or more signal parameters of the reference signals received by the apparatus in the carrier frequency $f_m$. The set of signal parameters may, for example, comprise at least one of: the time of arrival (TOA) or Angle-of-Departure (AOD). Alternatively, the set of one or more signal parameters may be determined but may be used to determine the weights but may not be used to determine the position of the apparatus. The set of signal parameters may be referred to a positioning outputs (POs).

As used herein, the expression "the position X determined for the carrier frequency F" means that the position X is determined by the apparatus using reference signals received by the apparatus in the carrier frequency F.

The apparatus may be configured to perform a method herein referred to as positioning method as follows. Multiple reference signals may be received from the one or more nodes in the multiple carrier frequencies $f_1, \ldots, f_N$. This may be referred to as reception step of the positioning method. The number of carrier frequencies may be N. The apparatus may derive or determine the position $\rho_m$ of the apparatus per carrier frequency $f_m$ using the received reference signals received in the carrier frequency $f_m$. This may be referred to as position computation step of the positioning method. The determined positions may be named as current positions (or measured positions). A weight $w_m$ may be determined per carrier frequency $f_m$. The weight $w_m$ is indicative of relationships between the position $\rho_m$ determined for the carrier frequency $f_m$ and the positions determined for the other carrier frequencies. This may be referred to as weight evaluation step. This may result in weights $w_1, \ldots, w_N$. The determined positions may be weighted using the weights respectively for obtaining an estimate of the position of the apparatus. This may be referred to as position estimation step of the positioning method. For example, the estimated position may be a weighted sum (e.g., $$\sum_{m=1}^{N} w_m \times \rho_m$$

) of the current positions using the determined weights. Alternatively, the estimated position may be an averaged weighted sum $$\left(\text{e.g., } \frac{\sum_{m=1}^{N} w_m \times \rho_m}{N}\right)$$

of the current positions using the determined weights.

The present subject matter may be advantageous as it may enable a centimetre-level position accuracy of the apparatus. The present subject matter may enable to aggregate the positioning outputs from reference signals received in different carrier frequencies. The present method may be agnostic to the considered positioning method for sub-bands/carriers. The positioning output corresponding to a carrier frequency is weighted according to the received signals at other carrier frequencies.

The weigh $w_m$ of the carrier frequency $f_m$ is indicative of a relationship between the position $\rho_m$ obtained using the reference signals of the carrier frequency $f_m$ and the positions ($\{\rho_j\}_{j=1, \ldots, N, j \neq m}$) obtained using reference signals of the remaining carrier frequencies $\{f_j\}_{j=1, \ldots, N, j \neq m}$. The other carrier frequencies ($\{\rho_j\}_{j=1, \ldots, N, j \neq m}$) may be the N−1 carrier frequencies which are different from the carrier frequency $f_m$. The relationship between two positions may indicate a similarity of the positions, e.g., the similarity may be a distance between the positions. For example, the weight $w_m$ may indicate how likely the position $\rho_m$ is relative to the other positions ($\{\rho_j\}_{j=1, \ldots, N, j \neq m}$). Alternatively, the weight $w_m$ may indicate how likely the signal parameters which are defined using reference signals of the carrier frequency $f_m$ are relative to the respective signal parameters defined using reference signals of the other carrier frequencies ($\{f_j\}_{j=1, \ldots, N, j \neq m}$). For example, the weigh $w_1$ of the carrier frequency $f_1$ is indicative of a position-to-position relationship between the position determined for the carrier frequency $f_1$ and the determined positions of the remaining carrier frequencies $f_2, \ldots, f_N$, the weigh $w_2$ of the carrier frequency $f_2$ is indicative of a position-to-position relationship between the position determined for the carrier frequency $f_2$ and the determined positions of the remaining carrier frequencies $f_1, f_3, \ldots, f_N$ and so forth.

The weight evaluation step may be performed using a definition the weights $\{w_m\}_{m=1, \ldots, N}$. For example, the weights $\{w_m\}_{m=1, \ldots, N}$ may be defined using a model. The model may be an empirical model or statistical model. The model may be evaluated in the weight evaluation step by using values of the current positions in order to obtain the weights. This may enable an accurate and a systematic execution of the weight evaluation step based on currently received reference signals. Alternatively, the weights $\{w_m\}_{m=1, \ldots, N}$ may be predefined weights e.g., user defined weights. This may simplify the weight evaluation step and may thus save processing resources while providing reliable position estimates.

A first weight definition method may define or model a weight $w_m$ for a carrier frequency $f_m$ (m may be any number between 1 and N) as follows. The N−1 positions $\{\rho_j\}_{j=1, \ldots, N, j \neq m}$ which are defined using reference signals received in the other carrier frequencies $\{f_j\}_{j=1, \ldots, N, j \neq m}$ may be described by respective probability distributions, such that the probability distribution has as mean value the position $\rho_m$ of the apparatus which is defined using reference signals received in the carrier frequency $f_m$. For example, the position $p_1(m \neq 1)$ which is defined using reference signals received in the other carrier frequency $f_1$ may be described by a probability distribution whose mean value is the position $\rho_m$, the position $\rho_2(m \neq 2)$ which is defined using reference signals received in the other carrier frequency $f_2$ may be described by a probability distribution whose mean value is the position $\rho_m$, and so forth. Thus, the carrier frequency $f_m$ may be associated with N−1 individual probability distributions representing the other carrier frequencies $\{f_j\}_{j=1, \ldots, N, j \neq m}$ respectively. In addition, a joint probability distribution ($p^{(m)}$) may be defined for the carrier frequency $f_m$ as the combination of these N−1 individual probability distributions. The joint probability distribution $p^{(m)}$ may be a linear combination of the individual probability distributions. The weight $w_m$ associated with the carrier frequency $f_m$ may thus be defined as function of (e.g., proportional to) the joint probability distribution $p^{(m)}$ of the carrier frequency $f_m$.

The first weight definition method may thus result in a weight model of the weight $w_m$, e.g., the weight model may be $w_m = p^{(m)}$ or $w_m = \alpha \times p^{(m)}$ where $\alpha$ is a normalizing factor. The first weight definition method may enable to model the weight $w_m$ for the m-th carrier frequency by assessing how the positioning estimation from the m-th carrier frequency compares with the estimated positions from other the carrier frequencies.

The positioning method may use the weight model obtained by the first weight definition method in order to determine the weights $w_1, \ldots, w_N$ in the weight evaluation step. For that, the weight model may, for example, be evaluated per carrier frequency using the current positions which are determined in the position computation step of the positioning method in order to determine the weights. For example, the joint probability distribution $p^{(m)}$ may be evaluated per carrier frequency $f_m$ using the current positions which are determined in the position computation step of the positioning method in order to determine the weights.

In one example implementation of the first weight definition method for the carrier frequency $f_m$, the probability distribution of the position $\rho_j$ may have a further variable which is the variance ($\Sigma_j$). In this case, the positioning method may further comprise a step of determining for the other carrier frequencies $\{f_j\}_{j=1, \ldots, N, j \neq m}$ the variances $\{\Sigma_j\}_{j=1, \ldots, N, j \neq m}$ using reference signals received in the other carrier frequencies respectively. This may be referred to as variance determination step. The determined variances may be named as current variances.

In this case, the weight evaluation step may use both the current positions and the current variances in order to evaluate weight model e.g., in order to evaluate the joint probability distribution. This may further improve the positioning accuracy according to the present subject matter because the estimations are provided with variances which enable to obtain the distribution of data around the estimated positions.

In one example implementation of the first weight definition method for the carrier frequency $f_m$, the joint probability distribution is provided as a weighted sum of the individual probability distributions using carrier confidence coefficients as weights. The carrier confidence coefficients are defined per carrier frequency of the N carrier frequencies. The carrier confidence coefficient $$(\phi_j^{(m)}, j \neq m)$$

associated with the carrier frequency $f_m$ indicates a signal reception performance in the carrier frequency $f_m$ e.g., taking into account the remaining carrier frequencies $\{f_j\}_{j=1, \ldots, N, j \neq m}$. This example may be advantageous because the positions are estimated based on position-to-position relationships as well as on the quality of reference signals used to estimate said relationships. This may further improve the accuracy of the estimated position of the apparatus.

In one example implementation of the first weight definition method for the carrier frequency $f_m$, the carrier confidence coefficient of the carrier frequency $f_m$ may be determined by at least: evaluating per carrier frequency of the other carrier frequencies $\{f_j\}_{j=1, \ldots, N, j \neq m}$ one or more signal indicators of reference signals received in the carrier frequency, ranking the carrier frequencies in accordance with the evaluation indicators, and setting a value to the carrier confidence coefficient based on the ranking, wherein the higher the ranking is the higher the value is. This example may enable a systematic and accurate definition of the carrier confidence coefficient. This may further improve the accuracy of the estimated position of the apparatus.

In one example implementation of the first weight definition method for the carrier frequency $f_m$, the signal indicators may include at least one of: signal-to-noise ratio of the reference signals received in the other carrier frequency $f_j$, or signal interference between the reference signals received in the carrier frequency $f_m$ and the reference signals received in the other carrier frequency $f_j$. This example may provide indicators as the signal-to-noise ratio that depend on individual carrier frequencies and indicators such as the interference level that depend on more than one carrier frequency.

In one example implementation of the first weight definition method for the carrier frequency $f_m$, the joint probability distribution $p^{(m)}$ is the average of the individual probability distributions.

In one example implementation of the first weight definition method for the carrier frequency $f_m$, the joint probability distribution $p^{(m)}$ is defined as the average of the individual probability distributions which is normalized with the sum of all N joint distributions, wherein the weights are determined using the normalized distribution. This may enable to normalize the weights, e.g., $$\sum_{m=1}^{N} w_m = 1.$$

In one example implementation of the first weight definition method for the carrier frequency $f_m$, the joint probability distribution $p^{(m)}$ is normalized with the sum of all N joint distributions, wherein the weights are determined using the normalized distribution. This may enable to normalize the weights, e.g., $$\sum_{m=1}^{N} w_m = 1$$

In one example implementation of the first weight definition method, the individual probability distributions are normal (or Gaussian) distributions, and the joint probability distribution is a multivariate normal distribution.

In one example implementation of the first weight definition method, the individual normal distribution may be defined as follows:

$$\mathcal{N}\left(\rho_m \mid \rho_j, \sum_j\right) = (2\pi)^{-D/2} \det\left(\sum_j\right)^{-1/2} \exp\left(-\frac{1}{2}(\rho_m - \rho_j)^T \sum_j^{-1} (\rho_m - \rho_j)\right),$$

where the position of the apparatus is provided as a vector in a D-dimensional space, and $\Sigma_j$ is the variance of the positioning estimation of position $\rho_j$, which may be a matrix, $\Sigma_j \in \mathbb{R}^{D \times D}$. For example, if the position is a 2-dimensional location, D may be equal to two (D=2), and therefore corresponding position and sigma $\Sigma_j$ are a vector and a matrix with dimensionality 1 by 2 and 2 by 2, respectively.

A second weight definition method may define or model a weight $w_m$ for a carrier frequency $f_m$ (m may be any number between 1 and N) as follows. The set of one or more signal parameters which may or may not be used to determine the position $\rho_m$ may be defined depending on the carrier frequency $f_m$ and the node t from which the reference signals are received. The set of one or more signal parameters may be defined using reference signals received from each node t and in the carrier frequency $f_m$. The set of one or more signal parameters may be referred to as $$\alpha_t^{(m)},$$

where t may be an integer number between 1 and the total number $T_m$ of nodes from which reference signals are received in the carrier frequency $f_m$. That is, the set of one or more signal parameters $$\alpha_t^{(m)}$$

is associated with the pair $(f_m, t)$ carrier frequency $f_m$ and node t. The group of sets of signal parameters which are obtained from all nodes using reference signals in the carrier frequency $f_m$ may be referred to as $$\{\alpha_t^{(m)}\}_{t=1, \ldots, T_m}.$$

That is, the group of sets of signal parameters $$\{\alpha_t^{(m)}\}_{t=1, \ldots, T_m}$$

are associated with the $T_m$ pairs $$(f_m, 1), (f_m, 2) \ldots (f_m, T_m). \ \alpha_t^{(m)}$$

may be one parameter or a vector of parameters in case the set has more than one signal parameter. For example, if the set of signal parameters comprise TOA $$(\tau_t^{(m)})$$

and AOD $$(\theta_t^{(m)}),$$

then $$\alpha_t^{(m)}$$

may be provided as a vector:

$$\alpha_t^{(m)} = \left[\tau_t^{(m)}, \theta_t^{(m)}\right].$$

The set of one or more signal parameters which are determined for the other carrier frequency ($f_j$, j≠m), may be referred to as $$\alpha_t^{(j)},$$

where t may be a number between 1 and the total number $T_j$ of nodes from which reference signals are received in the carrier frequency $f_j$. Thus, N groups of sets of signal parameters, $$\{\alpha_t^{(1)}\}_{t=1, \ldots ,T_1}, \{\alpha_t^{(2)}\}_{t=1, \ldots ,T_2}, \ldots , \{\alpha_t^{(N)}\}_{t=1, \ldots ,T_N}$$

may be provided. For a given pair of carrier frequency ($f_j$, j≠m) and node t of the $T_j$ nodes, the set of signal parameters $$\alpha_t^{(j)}$$

may be modelled by an (individual) likelihood function. The individual likelihood function for the pair of carrier frequency ($f_j$, j≠m) and node t may be referred to as $\nu_{(j,t)}$. The individual likelihood function $\nu_{(j,t)}$ follows a probability distribution ($\mathcal{L}_{(j,t)}$) having as mean values the set of signal parameters $$\alpha_t^{(m)}$$

of reference signals received in the carrier frequency $f_m$ from the node t. For example, the set of signal parameters $$\alpha_1^{(1)}$$

may be modelled by the individual likelihood function $\nu_{(1,1)}$ that follows the probability distribution $\mathcal{L}_{(1,1)}$ having mean values the set of signal parameters $$\alpha_1^{(m)},$$

the set of signal parameters $$\alpha_3^{(2)}$$

may be modelled by the individual likelihood function $\nu_{(2,3)}$ that follows the probability distribution $\mathcal{L}_{(2,3)}$ having mean values the set of signal parameters $$\alpha_3^{(m)}$$

and so forth. This may for example result in a number $(N-1)\times T_m$ of individual likelihood functions. For example, the number of nodes from which reference signals are received in each carrier frequency may be equal, $T_m=T_j$, ∀j≠m. A score function ($\nu^{(m)}$) may be defined for the carrier frequency $f_m$ as a combination of the individual likelihood functions. For example, the carrier frequency $f_1$ may be associated with the score function $\nu^{(1)}$, the carrier frequency $f_2$ may be associated with the score function $\nu^{(2)}$, and so forth.

The second weight definition method may thus result in a weight model of the weight $w_m$, e.g., the weight model may be $w_m=\nu^{(m)}$ or $w_m=\beta\times\nu^{(m)}$ where β is a normalizing factor. The weight $w_m$ associated with the carrier frequency $f_m$ may thus be defined as function of (e.g., proportional to) the score function $\nu^{(m)}$ associated with the carrier frequency $f_m$. The second weight definition method may enable to model the weight $w_m$ for the m-th carrier frequency by assessing how the initial parameters used for positioning estimation from the m-th carrier frequency compares with the corresponding parameters used to estimate positions from other the carrier frequencies.

The positioning method may use the weight model obtained by the second weight definition method in order to determine the weights $w_1, \ldots, w_N$ in the weight evaluation step. For that, the positioning method may further comprise the step of evaluating the set of signal parameters per node t and per carrier frequency $f_m$ using the received reference signals. This may be referred to as the signal parameter evaluation step. The signal parameter evaluation steps may, for example, be part of the position computation step in case the set of signal parameters are used to determine the position of the apparatus in the position computation step. The evaluated set of signal parameters may be named current set of signal parameters. The weight model may be evaluated using the current sets of signal parameters in order to determine the weights $w_1, \ldots, w_N$. For example, the score function $\nu^{(m)}$ may be evaluated using the current sets of signal parameters.

In one example implementation of the second weight definition method for the carrier frequency $f_m$, an overall likelihood function ($\nu_{(j)}$) per other carrier frequency ($f_j$, j≠m) may be defined by combining the individual likelihood functions of the one or more nodes and the other carrier frequency ($f_j$, j≠m). The score function $\nu^{(m)}$ is a combination of the overall likelihood functions of the other carrier frequencies $\{f_j\}_{j=1, \ldots, N, j\neq m}$.

In one example implementation of the second weight definition method for the carrier frequency $f_m$, the combination of the individual likelihood functions is a product of the likelihood functions e.g., $$\nu_{(j)} = \prod_{t=1}^{T_j} \nu_{(j,t)}.$$

In one example implementation of the second weight definition method for the carrier frequency $f_m$, the carrier confidence coefficient $$\left(\phi_j^{(m)}, j \neq m\right)$$

may be determined per other carrier frequency ($f_j$, j≠m). The carrier confidence coefficient may be indicative of a signal reception performance in the carrier frequency; wherein the combination of the overall likelihood functions is a weighted sum of the overall likelihood functions using the carrier confidence coefficients as weights e.g., $$v^{(m)} = \sum_{\substack{j=1 \\ j\neq m}}^{N} \phi_j^{(m)} v_{(j)}.$$

This example may be advantageous because the positions are estimated based on position-to-position relationships as well as on the quality of reference signals used to estimate said relationships. This may further improve the accuracy of the estimated position of the apparatus.

In one example implementation of the second weight definition method for the carrier frequency $f_m$, the individual likelihood function $v_{(j,t)}$ may be defined using a LOS probability, such that the individual likelihood function follows the probability distribution (e.g., $v_{(j,t)}=\mathcal{L}_{(j,t)}$) in case the apparatus is in LOS condition to the node t, or follows a complement of the probability distribution (e.g., $v_{(j,t)}=1-\mathcal{L}_{(j,t)}$) in case the apparatus is in No-LOS (NLOS) condition to the node t. This example may provide a likelihood that an estimated position for carrier $f_m$ is in LOS region of a node based on the set of signal parameters of the other carrier and that node. For example, the LOS probability for the carrier frequency $f_m$ may be estimated using a LOS condition determining parameter $$\left(L_t^{(j)}\right)$$

that may be evaluated per pair of other carrier frequency $f_j$ ($j\neq m$) and node t using the reference signals. The LOS condition determining parameter $$L_t^{(j)}$$

may, for example, be determined as part of the signal parameter evaluation step of the positioning method. The value of the LOS condition determining parameter $$L_t^{(j)}$$

may be one indicating that the apparatus is LOS condition with the node t for reference signals received by the apparatus in the carrier frequency $f_j$. The value of the LOS condition determining parameter $$L_t^{(j)}$$

may be zero indicating that the apparatus is NOLOS condition with the node t for reference signals received by the apparatus in the carrier frequency $f_j$.

In one example implementation of the second weight definition method for the carrier frequency $f_m$, the probability distribution is a product of probability distributions of the set of signal parameters respectively, wherein the probability distribution is preferably a normal distribution. For example, if the set of signal parameters comprise TOA $$\left(\tau_t^{(m)}\right)$$

and AOD $$\left(\theta_t^{(m)}\right),$$

then the probability distribution $\mathcal{L}_{(j,t)}$ for a given pair of other carrier frequency ($f_j$, $j\neq m$) and node t may be defined as $$\mathcal{L}_{(j,t)} = \mathcal{L}_{(j,t)}\left(\tau_t^{(j)}\right) \times \mathcal{L}_{(j,t)}\left(\theta_t^{(j)}\right), \text{ where } \mathcal{L}_{(j,t)}\left(\tau_t^{(j)}\right)$$

is the probability distribution for the parameter TOA and $$\mathcal{L}_{(j,t)}\left(\theta_t^{(j)}\right)$$

is the probability distribution for the parameter AOD.

In one example implementation of the second weight definition method for the carrier frequency $f_m$, the set of signal parameters comprise TOA and AOD, and the individual likelihood function may be defined as follows:

$$\mathcal{L}_{(j,t)}\left(l = \rho_m \,\middle|\, \tau_t^{(j)}, \theta_t^{(j)}\right) = \frac{1}{2\pi\sigma_\tau\sigma_\theta} \exp\left(-\frac{1}{2\sigma_\tau^2}\left(\tau_t^{(j)} - \tau_t^{(m)}\right)^2\right) \exp\left(-\frac{1}{2\sigma_\theta^2}\left(\theta_t^{(j)} - \theta_t^{(m)}\right)^2\right),$$

where $\sigma_T$ and $\sigma_\theta$ define the standard deviation of TOA $$\left(\tau_t^{(j)}\right)$$

and AOD $$\left(\theta_t^{(j)}\right)$$

from the means values TOA $$\left(\tau_t^{(m)}\right)$$

and AOD $$\left(\theta_t^{(m)}\right)$$

determined for the location $\rho_m$. This indicates that the probability distribution of the individual likelihood function $\mathcal{L}_{(j,t)}$ is the product of two normal distributions of the variables TOA $$\left(\tau_t^{(j)}\right)$$

and AOD $$\left(\theta_t^{(j)}\right)$$

respectively, wherein the mean of the normal distributions are TOA $$\left(\tau_t^{(m)}\right)$$

and AOD $$\left(\theta_t^{(m)}\right)$$

determined for the carrier frequency $f_m$ respectively. The two normal distributions may be defined as $$\mathcal{L}_{(j,t)}\left(\tau_t^{(j)}\right) = \frac{1}{\sqrt{2\pi}\,\sigma_\tau} \exp\left(-\frac{1}{2\sigma_\tau^2}\left(\tau_t^{(j)} - \tau_t^{(m)}\right)^2\right) \text{ and } \mathcal{L}_{(j,t)}\left(\theta_t^{(j)}\right) = \frac{1}{\sqrt{2\pi}\,\sigma_\theta} \exp\left(-\frac{1}{2\sigma_\theta^2}\left(\theta_t^{(j)} - \theta_t^{(m)}\right)^2\right).$$

A third weight definition method may define or model a weight $w_m$ for a carrier frequency $f_m$ (m may be any number between 1 and N) as follows. The weight $w_m$ may be defined as the carrier confidence coefficient indicative of signal reception performance in the carrier frequency $f_m$ e.g., the weight model may be $$w_m = \phi_j^{(m)}.$$

In one example, the carrier confidence coefficient may be defined as follows:

$$\phi_j^{(m)} = \frac{1}{N-1}.$$

This may be advantageous in case signals of the carrier frequencies may be equally processed.

A fourth weight definition method may define or model a weight $w_m$ for a carrier frequency $f_m$ (m may be any number between 1 and N) as follows. The weight $w_m$ may be defined as function of the differences ($\{\rho_m - \rho_j\}_{j=1, \ldots, N, j\neq m}$) between the current position $\rho_m$ determined for the carrier frequency $f_m$ with the current positions ($\{\rho_j\}_{j=1, \ldots, N, j\neq m}$) for the other carrier frequencies ($\{f_j\}_{j=1, \ldots, N, j\neq m}$). The weight $w_m$ may, for example, be the sum, $$w_m = \sum_{\substack{j=1 \\ j\neq m}}^{N} \exp\left((\rho_m - \rho_j)^2\right).$$

In one example implementation of the weight evaluation step, the weights may be normalized. For example, the weight $w_m$ may be normalized as follows:

$$w_m = \frac{v^{(m)}}{\sum_{n=1}^{N} v^{(n)}}$$

if the second weight definition method is used, or normalized as follows:

$$w_m = \frac{p^{(m)}}{\sum_{n=1}^{N} p^{(n)}}$$

if the first weight definition method is used, or $$w_m = \frac{w_m}{\sum_{n=1}^{N} w_m}$$

if the third or fourth weight definition method is used. This may, for example, enable to obtain a sum of weights equal to one, $$\sum_{m=1}^{N} w_m = 1.$$

The normalization of the weight may, for example, be performed in case the score function or joint probability distribution are not normalized.

In one example, the apparatus is configured to perform the positioning method in response to receiving a localization request from a core network element. The core network element may, for example, be location management function (LMF).

For example, the LMF may ask the apparatus (e.g., UE) to report a range to an anchor, or the UE elevation or a 2D location of the UE. In this case, the position computation step may be configured to process the reference signals to provide, based on the request, the position as the range to the anchor or as the UE elevation, or the 2D location of the UE. Thus, the position computation step may provide a position which may be anything from: 2D location, 3D location, range, elevation, or other positioning measurement.

In one example, the reference signal may be a Positioning Reference Signal (PRS) or a sounding reference signal (SRS). This may be advantageous as it may enable a seamless integration of the present subject matter in existing systems. It may also save resources that would otherwise be used to define new reference signals.

In one example implementation of the position computation step of the positioning method, the current position of the apparatus may be determined from the received reference signals as a single value. Alternatively, a Bayesian approach may be used to estimate, based on the received reference signals or other serving cell information, the current position of the apparatus as well as the variance. For example, the posterior pdf of the location may be computed using a selected location prior pdf and a likelihood pdf using knowledge about the time of arrival of the PRS, the serving cell position, etc. In another example, simultaneous localization and mapping may be used to compute both the apparatus and the reflectors locations. In another example, supervised learning methods such as deep neural networks, convolutional neural networks etc., may be trained to compute a soft location estimate i.e., a mean and a variance of the location of the apparatus.

In one example implementation of the reception step of the positioning method, the apparatus may comprise a single-carrier positioning receiver, wherein the single-carrier positioning receiver is used independently for each carrier frequency $f_m$, m=1:N. This may enable backwards compatibility by re-utilizing the same single-carrier positioning receiver. In particular, this may enable a backwards compatible carrier aggregation (CA) positioning receiver that operates with a variable number of aggregated carriers and it is agnostic to the aggregation method (e.g., intra- or inter-band, contiguous, non-contiguous).

In one example implementation of the reception step of the positioning method, the references signals comprise one or more subsets of the reference signals, each subset is transmitted in multiple carrier frequencies in accordance with a carrier aggregation technique.

In one example implementation of the reception step of the positioning method, the received reference signals may occupy a variable bandwidth (BW), which is an integer multiple of four physical resource blocks (PRBs), where the minimum BW is 4 PRBs and the maximum is 272 PRBs. That is, the received reference signal may occupy a BW=4k PRBs, where k=1:68 and a PRB contains a number P=12 of subcarriers.

In one example implementation of the reception step of the positioning method, the received reference signals may occupy a variable number of subcarriers in each BW, according to the comb setting. The comb c may take any value in the set C={2, 4, 6, 12}, where comb c signifies that every c-th carrier contains a positioning sample.

In one example implementation of the reception step of the positioning method, the received reference signals may occupy a variable number of symbols e.g., the reference signal may be h Orthogonal Frequency-Division Multiplexing (OFDM) symbols long, where h takes any value in the set H={2, 4, 6, 12}.

These examples may be advantageous as the present apparatus may be able to process reference signals that can occupy any number of subcarriers between 8=(4×12)/12×2 and 58752=3×(4×12×68)/2×12, where these subcarriers can be spread over the duration of 2 to 12 OFDM symbols, therefore, the positioning receiver may receive throughout consecutive positioning sessions, reference signals with a variable number of aggregated carriers, a variable bandwidth per carrier and variable duration. The positioning receiver of the apparatus may be able to extract the required positioning measurements and/or location estimates regardless of the size of the received reference signal and of the number of aggregated carriers.

The present subject matter may thus robustly combine the aggregated carriers into a positioning receiver that is agnostic to the number, BW and resolution of each carrier and may extract accurate positioning measurements that exploit channel information at all aggregated carrier frequencies.

The notation $\{\rho_j\}_{j=1, \ldots, N, j \neq m}$ as used herein refers to the N−1 positions respectively for the other N−1 carrier frequencies $\{f_j\}_{j=1, \ldots, N, j \neq m}$ which are different from the carrier frequency $f_m$, where j≠m indicates that j is different from m.

The present subject matter may comprise the following examples.

Example 1

An apparatus comprising: at least one processor; an antenna; and at least one memory storing instructions that, when executed by the at least one processor, cause the apparatus at least to perform: receiving reference signals from at least one node, the reference signals being received in multiple carrier frequencies; processing the reference signals for determining per carrier frequency a position of the apparatus, referred to as measured position; determining a weight per carrier frequency being indicative of relationships between the position determined for the carrier frequency and the positions determined for the other carrier frequencies; weighting the measured positions using the weights for obtaining an estimate of a position of the apparatus.

Example 2

A non-transitory computer readable medium comprising program instructions that, when executed by an apparatus, cause the apparatus to perform at least the following: receiving reference signals from at least one node, the reference signals being received in multiple carrier frequencies; processing the reference signals for determining per carrier frequency a position of the apparatus, referred to as measured position; determining a weight per carrier frequency being indicative of relationships between the position determined for the carrier frequency and the positions determined for the other carrier frequencies; weighting the measured positions using the weights for obtaining an estimate of a position of the apparatus.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows devices 110 and 112. The devices 110 and 112 may, for example, be user devices. The devices 110 and 112 are configured to be in a wireless connection on one or more communication channels with a node 114. The node 114 is further connected to a core network 120. In one example, the node 114 may be an access node (such as (e/g)NodeB) 114 providing or serving devices in a cell. In one example, the node 114 may be a non-3GPP access node. The physical link from a device to a (e/g) NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 20 (CN or next generation core NGC). For example, the (e/g)NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than an existing LTE system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by reference numeral 122, or utilize services provided by them. The communication network may also be able to support the usage of cloud services, for example at least part of core network operations may be carried out as a cloud service (this is depicted in FIG. 1 by "cloud" 124). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 114) and non-real time functions being carried out in a centralized manner (in a centralized unit, CU 118).

It should also be understood that the distribution of labour between core network operations and base station operations may differ from that of the LTE or even be non-existent. Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 116 in the mega-constellation may cover several satellite-enabled network entities that create on-ground cells. The on-ground cells may be created via an on-ground relay node 114 or by a gNB located on-ground or in a satellite.

It is understandable for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. One of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
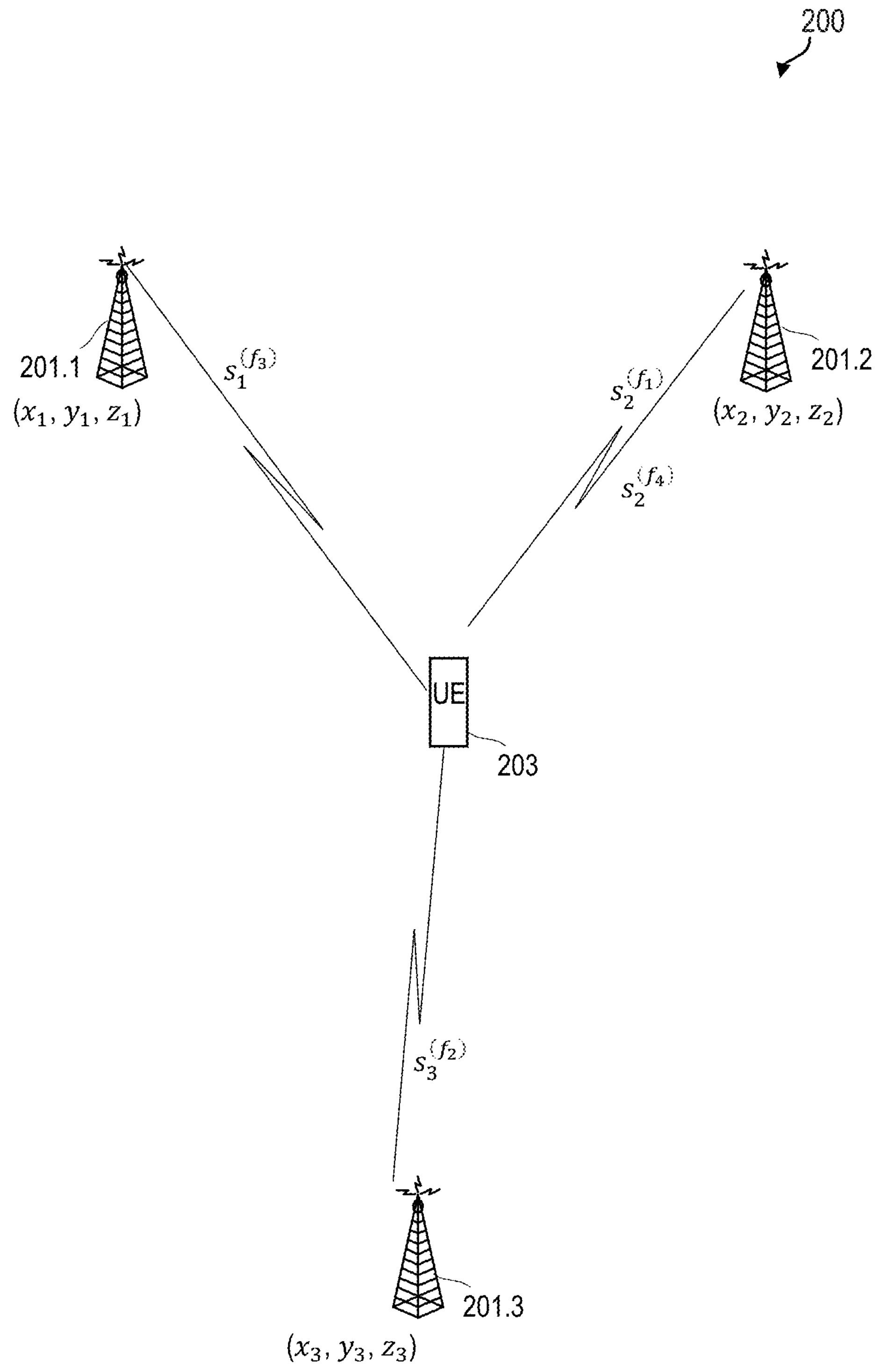
FIG. 2 is a schematic illustration of a wireless communication system.

FIG. 2 is a schematic illustration of a wireless communication system 200. The communication system 200 may, for example, be configured to use a time division duplex (TDD) technique for data transmission.

For simplicity, communication system 200 is shown to include three nodes 201.1, 201.2, 201.3 and one user equipment 203. Each node of the three nodes 201.1, 201.2 and 201.3 may, for example, be eNodeB or gNB e.g., as described with reference to FIG. 1. That is, the communication system 200 may support a same RAT or different RATs.

The UE 203 may communicate wirelessly with the base stations 201.1, 201.2, 201.3 using RF signals and standardized protocols for the modulation of the RF signals and the exchange of information packets.

In this particular example, the nodes 201.1, 201.2 and 201.3 may be located at known locations which may be represented in a reference coordinate system as $(x_k, Y_k, z_k)$, where k=1, 2,3 in the example of FIG. 2. The UE 203 may receive reference signals such as PRSs or SRSs from the nodes 201.1, 201.2 and 201.3. For example, the node 201.1 may broadcast the reference signal $$s_1^{(f_3)}$$

in the carrier frequency $f_3$. The node 201.2 may broadcast the reference signals $$s_2^{(f_1)}$$

and $$s_2^{(f_4)}$$

in the carrier frequency $f_1$ and $f_4$. This may, for example, be performed using carrier aggregation technique. The node 201.3 may broadcast the reference signal $$s_3^{(f_2)}$$

in the carrier frequency $f_2$.

The UE 203 may be configured to determine its location according to the present subject matter by using the reference signals, $$s_1^{(f_3)}, s_2^{(f_1)}, s_2^{(f_4)}$$

and $$s_3^{(f_2)}.$$

Figure 3:
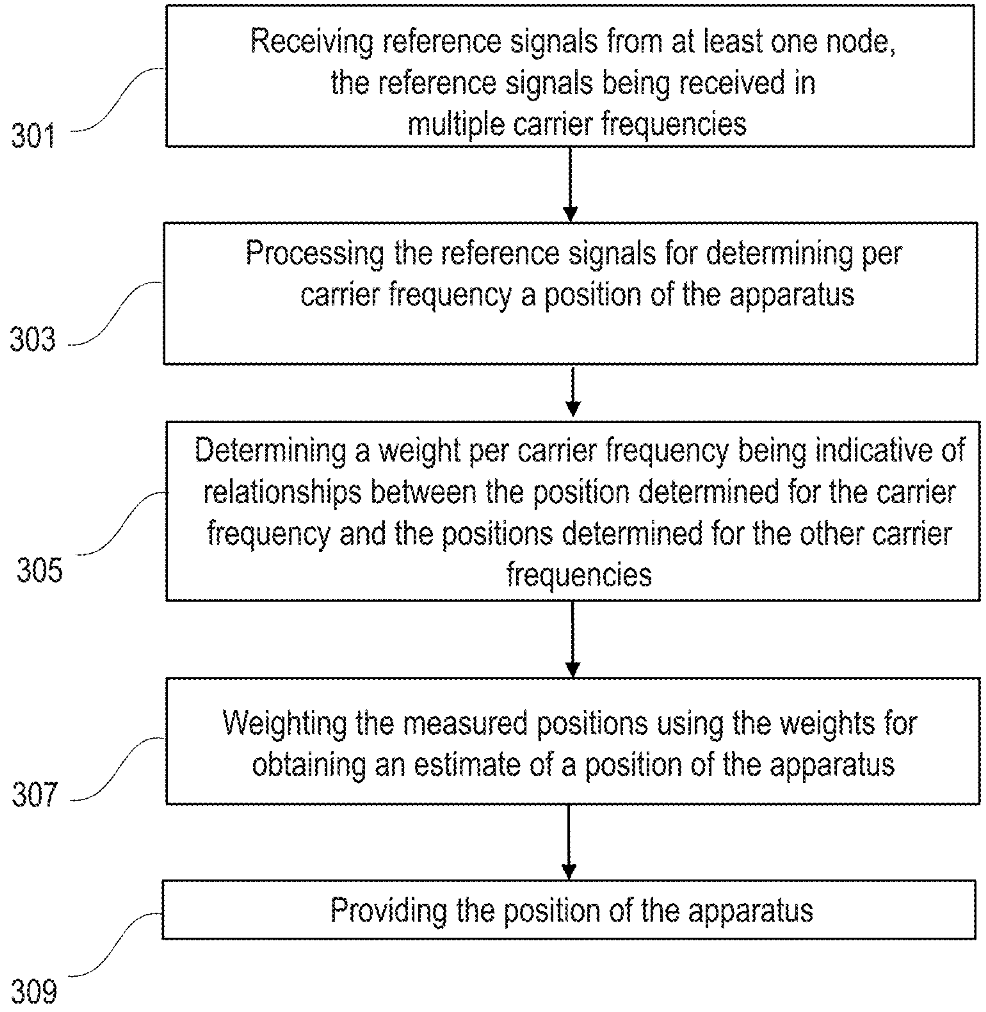
FIG. 3 is a flowchart of a method for estimating the position of an apparatus according to an example of the present subject matter.

FIG. 3 is a flowchart of a method for estimating the position of an apparatus according to an example of the present subject matter. For the purpose of explanation, the method described in FIG. 3 may be implemented in the system illustrated in FIG. 2, but is not limited to this implementation. The method may, for example, be performed by an apparatus such as the user equipment 203. In one example, the position of the apparatus may be the location of the apparatus, wherein the location may be a 2D location or 3D location. In another example, the position of the apparatus may include an orientation of the apparatus. In another example, the position of the apparatus may include an elevation of the apparatus. In another example, the position of the apparatus may include a range of the apparatus with respect to the node that sends the reference signals used to determine the range.

The method starts at step 301, where the apparatus receives reference signals from at least one node such as the nodes 201.1-201.3. The reference signals are received in multiple carrier frequencies. The multiple carrier frequencies may, for example, be N carrier frequencies which may be referred to as $f_1, \ldots, f_N$ respectively. Step 301 may be named the reception step.

Upon receiving the reference signals, the method proceeds to step 303 where the apparatus may process the reference signals for determining per carrier frequency a position of the apparatus. This may result in N determined positions which may be named or referred to as measured positions $\rho_1, \ldots, \rho_N$ respectively. Step 303 may be named the position computation step.

A weight may be determined by the apparatus in step 305 per carrier frequency. This may result in N determined weights which may be referred to as $w_1, \ldots, w_N$ respectively. Each weight $w_m$ (where $1 \leq m \leq N$) is indicative of relationships between the position $\rho_m$ determined for the carrier frequency $f_m$ and the positions ($\{\rho_j\}_{j=1, \ldots, N, j \neq m}$) determined for the other carrier frequencies ($\{f_j\}_{j=1, \ldots, N, j \neq m}$). The weight may be a predefined weight or may be determined using a weight model as described with reference to FIG. 4 or FIG. 5. Step 305 may be named the weight evaluation step.

The positions determined in step 303 may be weighted in step 307 by the apparatus using the weights for obtaining an estimate of a position of the apparatus. For example, the estimated position may be a weighted sum $$\left(\text{e.g., } \sum_{m=1}^{N} w_m \times \rho_m\right)$$

of the positions using the determined weights. Alternatively, the estimated position may be an averaged weighted sum $$\left(\text{e.g., } \frac{\sum_{m=1}^{N} w_m \times \rho_m}{N}\right)$$

of the positions using the determined weights. Step 307 may be named the position estimation step.

The apparatus may provide the estimate of the position of the apparatus in step 309.

Figure 4:
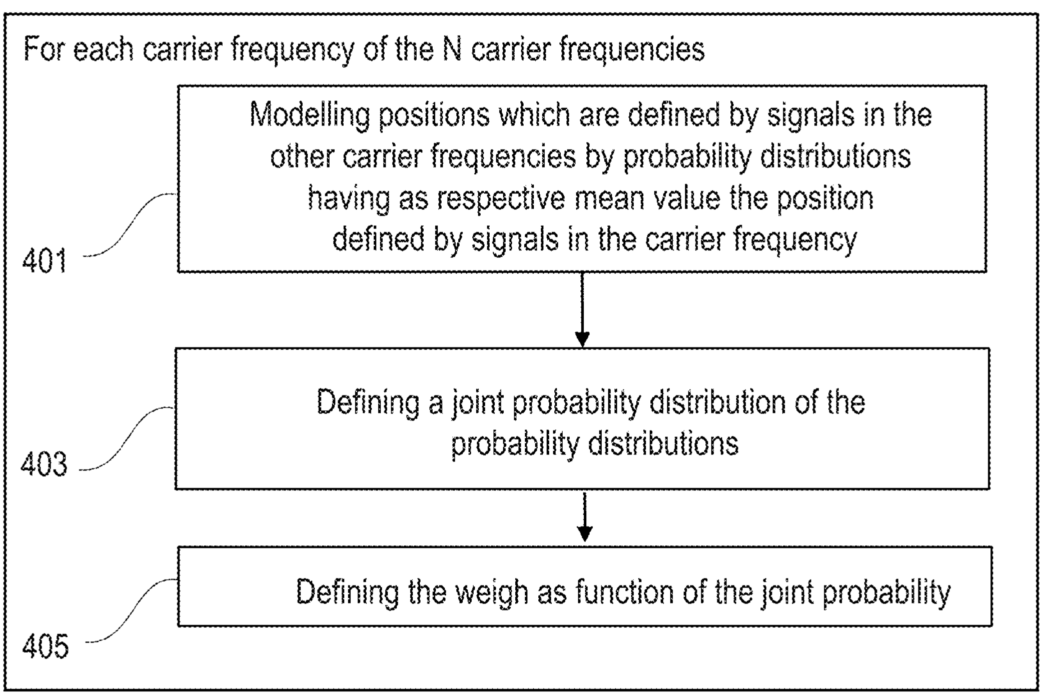
FIG. 4 is a flowchart of a method for defining weights according to an example of the present subject matter.

FIG. 4 is a flowchart of a method for defining the weights according to an example of the present subject matter. For the purpose of explanation, the method described in FIG. 4 may be implemented in the system illustrated in FIG. 2, but is not limited to this implementation. The method may, for example, be performed by an apparatus such as the user equipment 203 or one of the nodes 201.1, 201.2 and 201.3.

The method of FIG. 4 may provide a definition of the weight that may be used perform the weight evaluation step 305 of FIG. 3, where the apparatus receives reference signals in N carrier frequencies.

The method steps 401 to 405 may be performed for each carrier frequency $f_m$ of the N carrier frequencies in order to define the weight $w_m$.

The N−1 positions $\{\rho_j\}_{j=1, \ldots, N, j \neq m}$ which are defined using reference signals received in the other carrier frequencies $\{f_j\}_{j=1, \ldots, N, j \neq m}$ may be described in step 401 by respective probability distributions, such that the probability distribution has as mean value the position $\rho_m$ of the apparatus which is defined using reference signals received in the carrier frequency $f_m$. For example, the position $\rho_1$ ($m \neq 1$) which is defined using reference signals received in the other carrier frequency $f_1$ may be described by a probability distribution whose mean value is the position $\rho_m$, the position $\rho_2$ ($m \neq 2$) which is defined using reference signals received in the other carrier frequency $f_2$ may be described by a probability distribution whose mean value is the position $\rho_m$, and so forth. Thus, the carrier frequency $f_m$ may be associated with N−1 individual probability distributions representing the other carrier frequencies $\{f_j\}_{j=1, \ldots, N, j \neq m}$ respectively. In step 403, a joint probability distribution ($p^{(m)}$) may be defined for the carrier frequency $f_m$ as the combination of these N−1 individual probability distributions. The joint probability distribution $\rho^{(n)}$ may be a linear combination of the individual probability distributions. The weight $w_m$ associated with the carrier frequency $f_m$ may thus be defined in step 405 as function of (e.g., proportional to) the joint probability distribution $\rho^{(m)}$ of the carrier frequency $f_m$.

The steps 401 to 405 method may enable to model the weight $w_m$ for the m-th carrier frequency by assessing how the positioning estimation from the m-th carrier frequency compares with the estimated positions from other the carrier frequencies.

Figure 5:
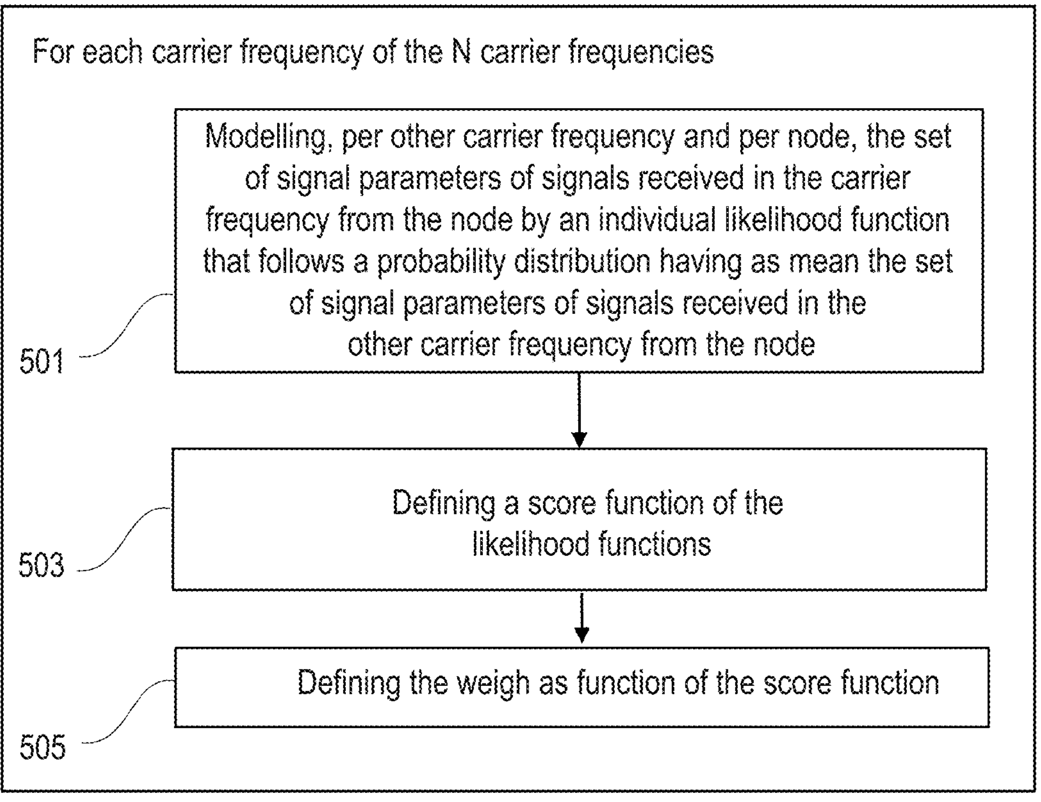
FIG. 5 a flowchart of a method for defining weights according to an example of the present subject matter.

FIG. 5 is a flowchart of a method for defining the weights according to an example of the present subject matter. For the purpose of explanation, the method described in FIG. 5 may be implemented in the system illustrated in FIG. 2, but is not limited to this implementation. The method may, for example, be performed by an apparatus such as the user equipment 203 or one of the nodes 201.1, 201.2 and 201.3.

The method of FIG. 5 may provide a definition of the weight that may be used perform the weight determination step 305 of FIG. 3, where the apparatus receives reference signals in N carrier frequencies.

The method steps 501 to 505 may be performed for each carrier frequency $f_m$ of the N carrier frequencies in order to define the weight $w_m$.

The set of one or more signal parameters which are used to determine the position $\rho_m$ may be defined using reference signals received from node t and in the carrier frequency $f_m$. The set of one or more signal parameters may be referred to as $$\alpha_t^{(m)},$$

where t may be an integer number between 1 and the total number $T_m$ of nodes from which reference signals are received in the carrier frequency $f_m$. That is, the set of one or more signal parameters $$\alpha_t^{(m)}$$

is associated with the pair ($f_m$, t) carrier frequency $f_m$ and node t. The sets of signal parameters which are obtained from all nodes using reference signals in the carrier frequency $f_m$ may be referred to as $$\{\alpha_t^{(m)}\}_{t=1,\ldots,T_m}.$$

That is, the sets of signal parameters $$\{\alpha_t^{(m)}\}_{t=1,\ldots,T_m}$$

are associated with the $$T_m \text{ pairs } (f_m, 1), (f_m, 2)\ldots (f_m, T_m)\cdot \alpha_t^{(m)}$$

may be one parameter or a vector of parameters in case the set has more than one parameter. For example, if the set of signal parameters comprise $$TOA(\tau_t^{(m)}), AOD(\theta_t^{(m)})$$

and LOS probability $$(L_t^{(m)}), \text{ then } \alpha_t^{(m)} = [\tau_t^{(m)}, \theta_t^{(m)}, L_t^{(m)}].$$

The set of one or more signal parameters which are used to determine the remaining positions ($\rho_j$, j≠m), may be referred to as $$\alpha_t^{(j)},$$

where t may be a number between 1 and the total number $T_j$ of nodes from which reference signals are received in the carrier frequency $f_j$. This may provide N sets of parameters, $$\{\alpha_t^{(1)}\}_{t=1,\ldots,T_1}, \{\alpha_t^{(2)}\}_{t=1,\ldots,T_2}, \ldots, \{\alpha_t^{(N)}\}_{t=1,\ldots,T_N}.$$

For a given pair of carrier frequency $f_j$, j≠m and node t of the $T_j$ nodes, the set of signal parameters $$\alpha_t^{(j)}$$

which are used to determine the position $\rho_j$ may be modelled in step 501 by an (individual) likelihood function. The individual likelihood function follows a probability distribution having as mean values the set of signal parameters $$\alpha_t^{(m)}$$

of reference signals received in the carrier frequency $f_m$ from the node t. For example, the set of signal parameters $$\alpha_1^{(1)}$$

may be modelled by the individual likelihood function that follows the probability distribution having mean values the set of signal parameters $$\alpha_1^{(m)},$$

the set of signal parameters $$\alpha_3^{(2)}$$

may be modelled by the individual likelihood function that follows the probability distribution having mean values the set of signal parameters $$\alpha_3^{(m)}$$

and so forth. This may for example result in a number $(N-1)\times T_m$ of individual likelihood functions.

A score function ($\nu^{(m)}$) may be defined in step 503 for the carrier frequency $f_m$ as a combination of the individual likelihood functions.

The weight $w_m$ associated with the carrier frequency $f_m$ may thus be defined in step 505 as function of (e.g., proportional to) the score function $\nu^{(m)}$ of the carrier frequency $f_m$.

The steps 501 to 505 method may enable to model the weight $w_m$ for the m-th carrier frequency by assessing how the positioning estimation from the m-th carrier frequency compares with the estimated positions from other the carrier frequencies.

Figures 6, 7:
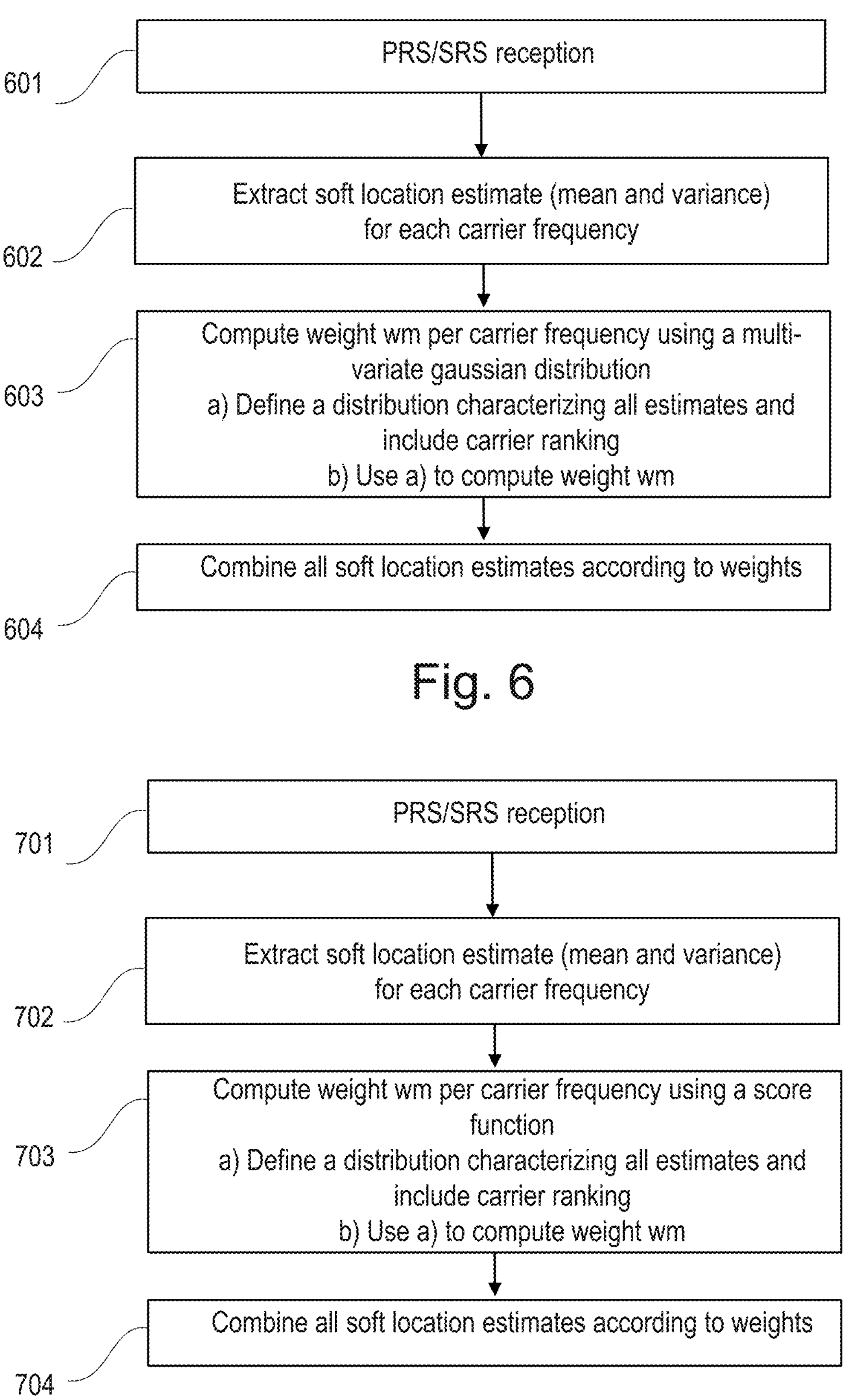
FIG. 6 is a flowchart of a method for estimating the position of an apparatus according to an example of the present subject matter.
FIG. 7 is a flowchart of a method for estimating the position of an apparatus according to an example of the present subject matter.

FIG. 6 is a flowchart of a method for estimating the position of an apparatus according to an example of the present subject matter. For the purpose of explanation, the method described in FIG. 6 may be implemented in the system illustrated in FIG. 2, but is not limited to this implementation. The method may, for example, be performed by an apparatus such as the user equipment 203.

In step 601, each positioning transmitter (TRP in DL/or UE in UL) transmits a positioning reference signals (PRS/SRS) in N carrier frequencies. In step 602, the positioning receiver of the apparatus extracts the positioning information using the received PRS/SRS signal at the m-th carrier frequency as $f_m$-PO=$\{\rho_m=\hat{\mu}_m, \hat{\Sigma}_m\}$, $\forall$m=1, . . . , N, where $\hat{\mu}_m \in \mathbb{R}^{D\times 1}$ and $\hat{\Sigma}_m \in \mathbb{R}^{D\times D}$, respectively, the mean and variance of the UE positioning estimation. In step 603, the receiver calculates the weight $w_m$ for the m-th carrier frequency by assessing how the positioning estimation from the m-th carrier frequency compares with the estimated positions from other carrier frequencies. For example, the weights may be calculated as follows: A multi-variate gaussian distribution for the UE position may be defined based on the estimated location in other carrier frequencies than the m-th carrier frequency, e.g., $$p^{(m)}(l) = \sum_{\substack{j=1 \\ j\neq m}}^{N} \phi_j^{(m)} N\left(l \mid \hat{\mu}_j, \hat{\sum}_j\right), \text{ where } \sum_{\substack{j=1 \\ j\neq m}}^{N} \phi_j^{(m)} = 1,$$

$$\text{and } N\left(l \mid \hat{\mu}_j, \hat{\sum}_j\right) = (2\pi)^{-D/2}\det\left(\hat{\sum}_j\right)^{-1/2}\exp\left(-\frac{1}{2}(l-\hat{\mu}_j)^T \hat{\sum}_j^{-1}(l-\hat{\mu}_j)\right),$$

where $$\phi_j^{(m)}$$

is the j-th carrier confidence coefficient based on the SNR level, interference level, etc. In case of no preference between the carrier frequencies, the carrier confidence coefficient may be defined as follows:

$$\phi_j^{(m)} = \frac{1}{N-1}, \ \forall j.$$

Based on the relative conformity of $\rho^{(m)}(l=\hat{\mu}_m)$, the weight $w_m$ for the m-th carrier frequency may be written as $$w_m = \frac{p^{(m)}(l=\hat{\mu}_m)}{\sum_{n=1}^{N} p^{(n)}(l=\hat{\mu}_n)}, \ \forall m \in \{1, \ldots, N\}.$$

Note that $$\sum_{m=1}^{N} w_m = 1.$$

In step 604, the receiver may combine the mean and variances from all carrier frequencies according to the obtained weights and computes a mean and variance of UE position estimation based on the aggregated carrier information as:

$$\mu^* = \sum_{m=1}^{N} w_m\hat{\mu}_m \text{ and } \Sigma^* = \sum_{m=1}^{N} w_m^2\hat{\Sigma}_m.$$

FIG. 7 is a flowchart of a method for estimating the position of an apparatus according to an example of the present subject matter. For the purpose of explanation, the method described in FIG. 7 may be implemented in the system illustrated in FIG. 2, but is not limited to this implementation. The method may, for example, be performed by an apparatus such as the user equipment 203.

In this example, the positioning output of the m-th carrier may be provided as estimation of the strongest path TOA, AOD, and LOS probability for each TRP, besides UE location in a D-dimensional space $$(\{(\tau_1^{(m)}, \theta_1^{(m)}, L_1^{(m)}), (\tau_2^{(m)}, \theta_2^{(m)}, L_2^{(m)}), \ldots, (\tau_{T_m}^{(m)}, \theta_{T_m}^{(m)}, L_{T_m}^{(m)}), \hat{\mu}_m\}).$$

In step 701, the positioning transmitter sends the positioning reference signals (PRS/SRS) in N carrier frequencies. In step 702, the positioning receiver extracts the positioning information using the received PRS/SRS signal at the m-th carrier frequency as $$fm\text{-}PO = \{(\tau_1^{(m)}, \theta_1^{(m)}, L_1^{(m)}), (\tau_2^{(m)}, \theta_2^{(m)}, L_2^{(m)}), \ldots, (\tau_{T_m}^{(m)}, \theta_{T_m}^{(m)}, L_{T_m}^{(m)}), \hat{\mu}_m\}, \quad \forall m = 1, \ldots, N,$$

where:

$$\tau_t^{(m)}$$

and $$\theta_t^{(m)}$$

denote respectively, the strongest path TOA and AOD of the t-th TRP, $T_m$ is the number TRPs for the m-th carrier, $T_m=T_j$, for each j≠m, $$L_t^{(m)} = 1$$

where on the PO from the m-th carrier indicates the UE is in LOS condition to the t-th TRP, otherwise $$L_t^{(m)} = 0$$

(NLOS condition). In addition, $\hat{\mu}_m \in \mathbb{R}^{D\times 1}$ denotes mean of the UE positioning estimation using the m-th carrier frequency received reference signal. In step 703, the receiver calculates the weight $w_m$ for the m-th carrier frequency by assessing the positioning estimation from the m-th carrier frequency comparing with the estimated positions from other carrier frequencies. For example, the weights may be calculated as follows: a score function $\nu^{(m)}(l)$ may be defined such that it verifies a proposal from the m-th PO using the calculated POs from other carrier frequencies, $$\mathcal{V}^{(m)}(\hat{\mu}_m) = \sum_{\substack{j=1 \\ j\neq m}}^{N} \phi_j^{(m)} \mathcal{V}_j\left(LOS\middle|\left(\tau_1^{(j)}, \theta_1^{(j)}, L_1^{(j)}\right), \ldots, \left(\tau_{T_j}^{(j)}, \theta_{T_j}^{(j)}, L_{T_j}^{(j)}\right)\right),$$

$$\text{where } \sum_{\substack{j=1 \\ j\neq m}}^{N} \phi_j^{(m)} = 1, \mathcal{V}_j\left(LOS\middle|\left(\tau_1^{(j)}, \theta_1^{(j)} L_1^{(j)}\right), \ldots, \left(\tau_T^{(j)}, \theta_T^{(j)}, L_T^{(j)}\right)\right) =$$

$$\mathcal{V}_{(j,1)}\left(LOS\middle|\left(\tau_1^{(j)} \theta_1^{(j)} L_1^{(j)}\right)\right) \ldots \times . \ \mathcal{V}_{(j,T_j)}\left(LOS\middle|\left(\tau_{T_j}^{(j)}, \theta_{T_j}^{(j)}, L_{T_j}^{(j)}\right)\right),$$

-continued $$\forall j \in \{1, \ldots, N\}, \text{ and } \mathcal{V}_{(j,t)}\left(LOS \middle| \left(\tau_t^{(j)}, \theta_t^{(j)}, L_t^{(j)}\right)\right) = \begin{cases} \mathcal{L}_{(j,t)}\left(LOS \middle| \tau_t^{(j)}, \theta_t^{(j)}\right) & , L_t^{(j)} = 1 \\ 1 - \mathcal{L}_{(j,t)}\left(LOS \middle| \tau_t^{(j)}, \theta_t^{(j)}\right) & , L_t^{(j)} = 0 \end{cases}$$

$$\forall t \in \{1, \ldots, T_j\},$$

where $$\mathcal{L}_{(j,t)}\left(LOS \middle| \tau_t^{(j)}, \theta_t^{(j)}\right)$$

is the likelihood function that location l is in LOS region of the t-th TRP based on the POs of the j-th carrier, $$\tau_t^{(j)}$$

and $$\theta_t^{(j)}.$$

As an example, the LOS likelihood function can be written as $$\mathcal{L}_{(j,t)}\left(LOS \middle| \tau_t^{(j)}, \theta_t^{(j)}\right) = \frac{1}{2\pi\sigma_\tau\sigma_\theta} \exp\left(-\frac{1}{2\sigma_\tau^2}\left(\tau_t^{(j)} - \tau_l^t\right)^2\right) \exp\left(-\frac{1}{2\sigma_\theta^2}\left(\theta_t^{(j)} - \theta_l^t\right)^2\right),$$

where $$\tau_l^t$$

and $$\theta_l^t$$

are the corresponding delay for direct path between the t-th TRP and location l.

$$\mathcal{L}_{(j,t)}\left(LOS \middle| \tau_t^{(j)}, \theta_t^{(j)}\right)$$

may be the likelihood that the UE is in LOS of node t. Also, $\sigma_\tau$ and $\sigma_\theta$ define the acceptance tolerance for TOA and AOD difference between the POs and evaluated location l. These may be selected by UE implementation and/or in combination with the localization accuracy requirement. Based on the relative conformity of $v^{(m)}(\hat{\mu}_m)$, the weight $w_m$ for the m-th carrier may be written as $$w_m = \frac{v^{(m)}(\hat{\mu}_m)}{\sum_{n=1}^{N} v^{(n)}(\hat{\mu}_n)},$$

$\forall m \in \{1, \ldots, N\}$. Note that $$\sum_{m=1}^{N} w_m = 1.$$

In step 704, the combined UE position estimate is subsequently based on the aggregated carrier information and can be expressed as $$\mu^* = \sum_{m=1}^{N} w_m \hat{\mu}_m.$$

Figure 8:
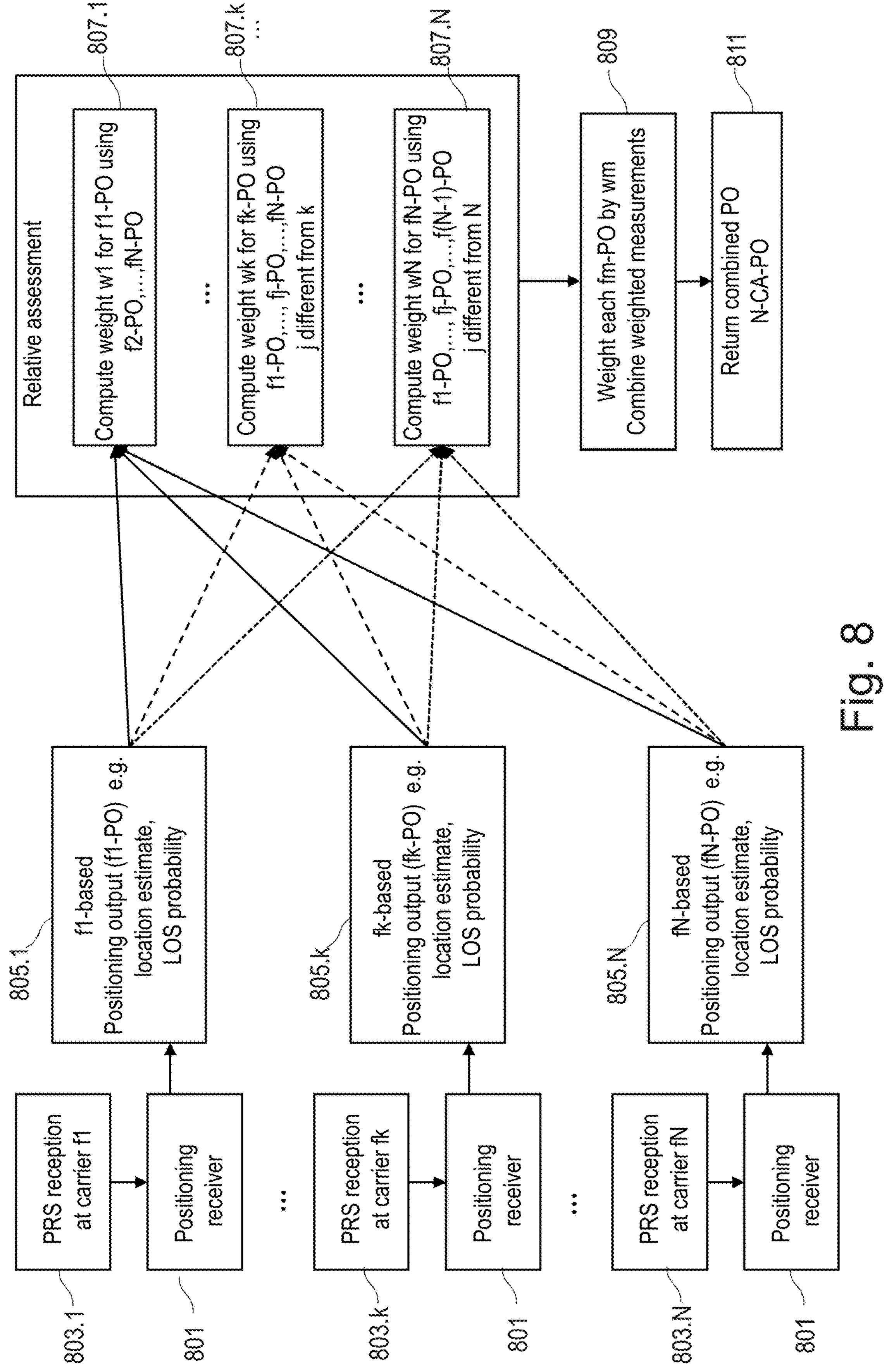
FIG. 8 is a diagram illustrating a method for estimating the position of an apparatus according to an example of the present subject matter.
Figure 9:
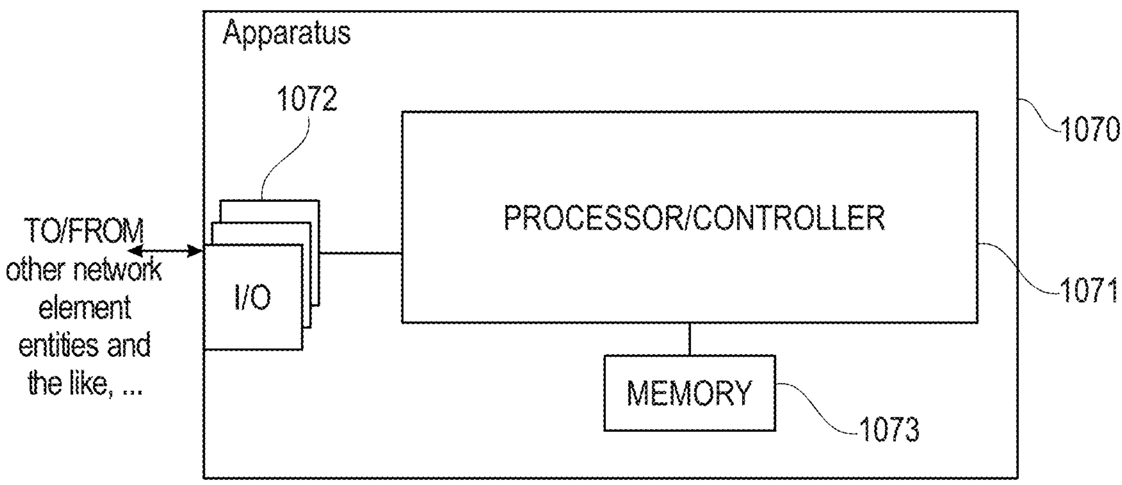
FIG. 9 is a block diagram showing an example of an apparatus according to an example of the present subject matter.

FIG. 8 is a diagram illustrating a method for estimating the position of an apparatus according to an example of the present subject matter. For the purpose of explanation, the method described in FIG. 8 may be implemented in the system illustrated in FIG. 2, but is not limited to this implementation. The method may, for example, be performed by an apparatus such as the user equipment 203.

The present method may enable a backwards compatible carrier aggregation (CA) positioning receiver that operates with a variable number of aggregated carrier frequencies and it may be agnostic to the aggregation method (e.g., intra- or inter-band, contiguous, non-contiguous). The backwards compatibility comes from re-utilizing a single-carrier positioning receiver independently, for each carrier $f_m$, m=1:N, and combining their carrier-specific positioning output (PO) e.g., location, LOS estimates, via the method shown in FIG. 8. In the following, the PO extracted using the reference signal sent on carrier $f_m$ may be called as $f_m$-based PO. The method targets to quantify how likely each $f_m$-based PO, m=1:N is relative to the POs extracted using the remaining carriers $f_j$, j≠m. To compute a carrier-specific PO likelihood, a score function is designed. Once the PO likelihood per carrier is generated, the CA-PO is obtained by combining all N POs weighted accordingly to each of their recently computed likelihoods.

The positioning receiver 801 of the apparatus may receive N PRSs in the carrier frequencies $f_1 \ldots f_N$ respectively in steps 803.1 through 803.N. The positioning receiver 801 may determine for each m-th received PRS the respective $f_m$-based positioning output ($f_m$–PO) in step 805.*m*, where 1≤m≤N. In addition, the positioning receiver may perform a relative assessment for computing weights. The positioning receiver 801 may determine for each m-th received PRS the respective weight $w_m$ using the computed position outputs $\{f_j\text{–PO}\}_{j=1, \ldots, N, j \neq m}$ in step 807.*m*. Each $f_m$–PO may be weighted by the respective weight $w_m$n, and the weighted measurements may be combined in step 809. The combined weighted measurements may be provided in step 811. In step 811, the combined weighted measurements may be returned to a requester who requested the position of the apparatus, wherein the method is performed in response to receiving the request.

In FIG. 10, a block circuit diagram illustrating a configuration of an apparatus 1070 is shown, which is configured to implement at least part of the present subject matter. It is to be noted that the apparatus 1070 shown in FIG. 10 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform the method as described in connection with FIG. 3, 4, 5, 6, 7 or 8.

For example, the processor 1071 is configured for: receiving reference signals from at least one node, the reference signals being received in multiple carrier frequencies;

processing the reference signals for determining per carrier frequency a position of the apparatus, referred to as measured position; determining a weight per carrier frequency being indicative of relationships between the position determined for the carrier frequency and the positions determined for the other carrier frequencies; weighting the measured positions using the weights for obtaining an estimate of a position of the apparatus.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. An apparatus comprising:

at least one processor;

an antenna; and at least one memory storing instructions that, when executed by the at least one processor, cause the apparatus at least to:

receive reference signals from at least one node, the reference signals being received in multiple carrier frequencies;

process the reference signals for determining per carrier frequency a position of the apparatus, referred to as measured position;

determine a weight per carrier frequency being indicative of relationships between the position determined for the carrier frequency and the positions determined for the other carrier frequencies;

weighting the measured positions using the weights for obtaining an estimate of a position of the apparatus.

2. The apparatus of claim 1, configured to determine the weight per carrier frequency by at least:

modelling positions which are defined by reference signals in the other carrier frequencies by probability distributions having as respective mean value the position defined by reference signals in the carrier frequency;

defining a joint probability distribution of the probability distributions;

evaluating the joint probability distribution using the measured positions of the multiple carrier frequencies, thereby obtaining the weight.

3. The apparatus of claim 2, wherein the probability distribution has as further variable a variance indicative of an amount of deviation from the mean value, the apparatus being further configured to:

determine per other carrier frequency the variance using the reference signals received in the other carrier frequency, wherein the evaluation of the joint probability distribution is performed using the measured positions of the multiple carrier frequencies and determined variances.

4. The apparatus of claim 2, further configured to:

determine per carrier frequency a carrier confidence coefficient indicative of a signal reception performance in the carrier frequency;

provide the joint probability distribution as a weighted sum of the probability distributions using the carrier confidence coefficients as weights.

5. The apparatus of claim 4, further configured to:

evaluate per carrier frequency one or more signal indicators of reference signals received in the carrier frequency;

rank the carrier frequencies in accordance with the evaluation indicators;

set a value to the carrier confidence coefficient based on the ranking, wherein the higher the ranking is the higher the set value is.

6. The apparatus of claim 5, wherein the signal indicators include at least one of:

signal-to-noise ratio or signal interference.

7. The apparatus of claim 2, wherein the joint probability distribution is the average of the probability distributions.

8. The apparatus of claim 2, wherein the probability distribution is a normal distribution, wherein the joint probability distribution is a multivariate normal distribution.

9. The apparatus of claim 1, wherein the position is determined using a set of one or more signal parameters, and the apparatus is configured to determine the weight per carrier frequency by at least:

modelling, per other carrier frequency and per node, the set of signal parameters of reference signals received in the carrier frequency from the node by an individual likelihood function that follows a probability distribution, the probability distribution having as mean the set of signal parameters of reference signals received in the other carrier frequency from the node;

defining a score function as a combination of the individual likelihood functions;

determining the set of signal parameters per node and per carrier frequency using the received reference signals;

evaluating the score function using the determined set of parameters, thereby obtaining the weight.

10. The apparatus of claim 9, wherein the set of signal parameters comprises time of arrival, TOA, and Angle-of-Departure, AOD.

11. The apparatus of claim 9, further configured to define the individual likelihood function using a LOS probability, such that the individual likelihood function follows the probability distribution in case the apparatus is in LOS condition to the node, or follows a complement of the probability distribution in case the apparatus is in NLOS condition to the node.

12. The apparatus of claim 9, wherein the probability distribution is a product of probability distributions of the set of signal parameters, wherein the probability distribution is preferably a normal distribution.

13. The apparatus of claim 1, wherein the weight is a carrier confidence coefficient indicative of signal reception performance in the specific carrier frequency.

14. The apparatus of claim 1, further configured to determine the weight per carrier frequency by at least:

combining exponents of the differences between the position determined for the carrier frequency with the determined positions of the other carrier frequencies.

15. The apparatus of claim 14, wherein the combination is the sum.

16. The apparatus of claim 1, further configured to determine the weight for the carrier frequency by at least:

determining per carrier frequency a carrier confidence coefficient indicative of signal reception performance in the carrier frequency;

using the carrier confidence coefficients for performing a weighted sum of the differences between the position determined for the specific carrier frequency with the determined positions of the other carrier frequencies.

17. The apparatus of claim 1, wherein the weights are normalized.

18. The apparatus of claim 1, wherein the reference signal is a sounding reference signal, SRS, or a positioning reference signal, PRS.

19. A method comprising:

receiving, by an apparatus, reference signals from at least one node, the reference signals being received in multiple carrier frequencies;

processing the reference signals for determining per carrier frequency a position of the apparatus, referred to as measured position;

determining a weight per carrier frequency being indicative of relationships between the position determined for the carrier frequency and the determined positions for the other carrier frequencies;

weighting the measured positions using the weights for obtaining an estimate of a position of the apparatus.

20. A non-transitory computer readable medium comprising program instructions that, when executed by an apparatus, cause the apparatus to perform at least the following:

receiving reference signals from at least one node, the reference signals being received in multiple carrier frequencies;

processing the reference signals for determining per carrier frequency a position of the apparatus, referred to as measured position;

determining a weight per carrier frequency being indicative of relationships between the position determined for the carrier frequency and the determined positions for the other carrier frequencies;

weighting the measured positions using the weights for obtaining an estimate of a position of the apparatus.

* * * * *